United States Patent
Lewis

(10) Patent No.: US 7,711,216 B2
(45) Date of Patent: May 4, 2010

(54) DEVICES AND METHODS FOR SPATIAL FILTERING

(75) Inventor: Jeffrey E. Lewis, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/864,742

(22) Filed: Sep. 28, 2007

(65) Prior Publication Data

US 2009/0087133 A1    Apr. 2, 2009

(51) Int. Cl.
*G02B 6/00* (2006.01)
*G02B 6/14* (2006.01)
(52) U.S. Cl. .............................. 385/11; 385/28; 385/122
(58) Field of Classification Search .................... 385/5, 385/11, 28, 31, 49, 122, 129–131
See application file for complete search history.

(56) References Cited

U.S. PATENT DOCUMENTS

| | | | |
|---|---|---|---|
| 4,984,861 A | 1/1991 | Suchoski, Jr. et al. | |
| 5,321,779 A * | 6/1994 | Kissa | 385/14 |
| 5,475,772 A * | 12/1995 | Hung et al. | 385/11 |
| 5,521,750 A | 5/1996 | Onoe et al. | |
| 6,351,575 B1 * | 2/2002 | Gampp et al. | 385/14 |
| 7,366,372 B2 * | 4/2008 | Lange | 385/29 |

OTHER PUBLICATIONS

International Searching Authority, "International Search Report", Aug. 3, 2009, Published in: WO.

* cited by examiner

*Primary Examiner*—Daniel Petkovsek
(74) *Attorney, Agent, or Firm*—Fogg & Powers LLC

(57) ABSTRACT

Methods and devices for polarizing light in a proton exchange polarizer where cross-coupling of unwanted modes of light is reduced with an integrated spatial filter. An optically transmissive substrate such as a substrate created from $LiNbO_3$ or $LiTaO_3$ has side surfaces, which reflect unguided TM mode light. The light originates from an input fiber. The input fiber is connected to the substrate at one end and an output fiber is connected to receive guided TE mode light at the opposite end. The spatial filter is positioned at the primary reflection position of the light with respect to the sides of the polarizer. To improve extinction further, the spatial filter can also be located at secondary reflection points in another alternate embodiment.

8 Claims, 5 Drawing Sheets

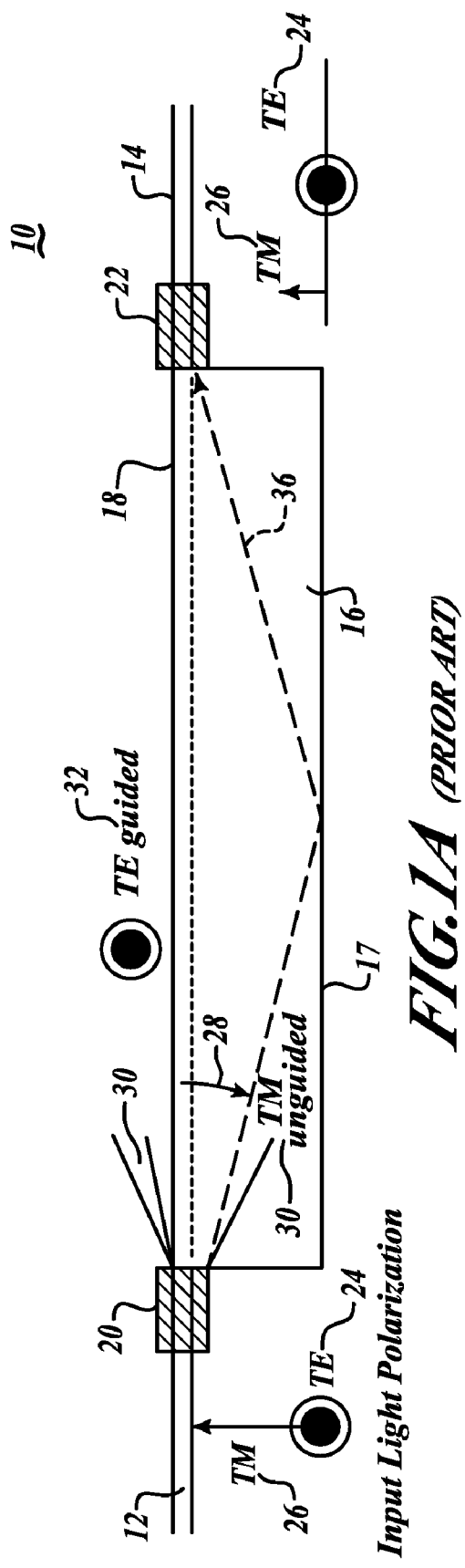
FIG.1A *(PRIOR ART)*
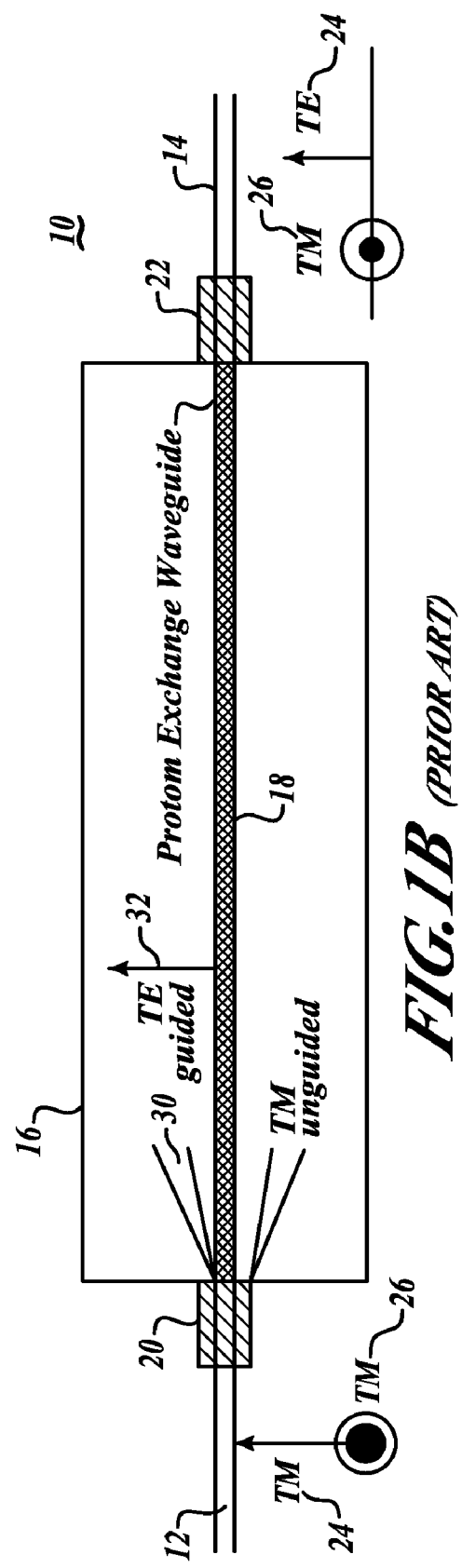
FIG.1B *(PRIOR ART)*

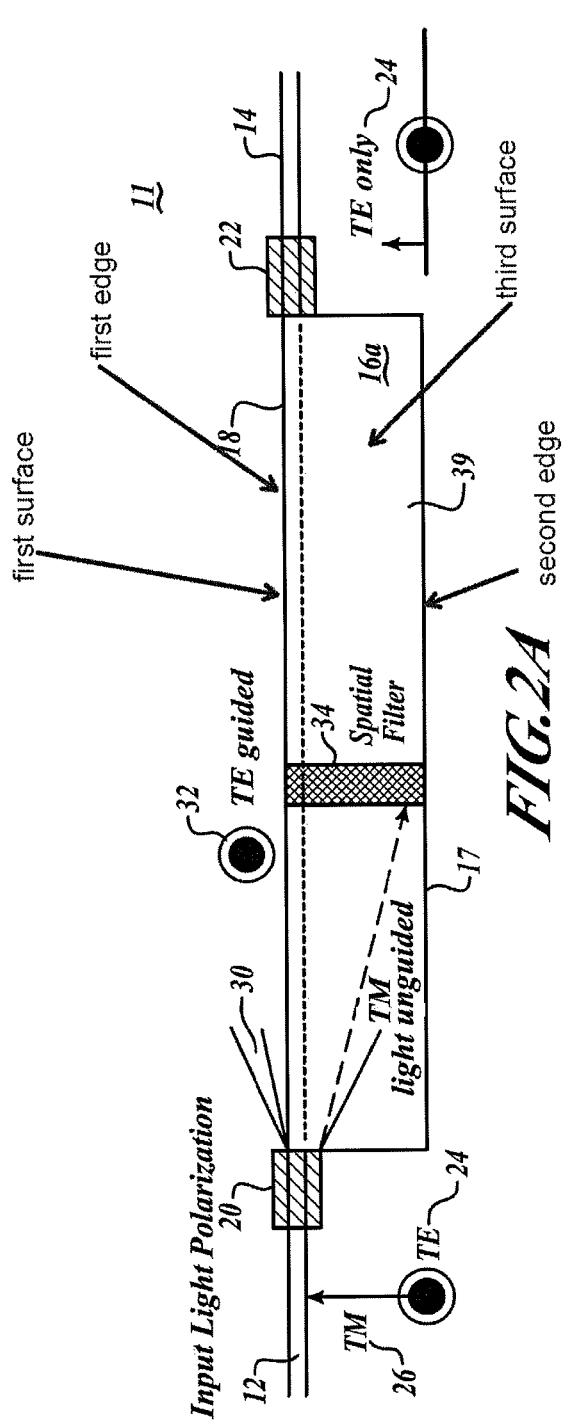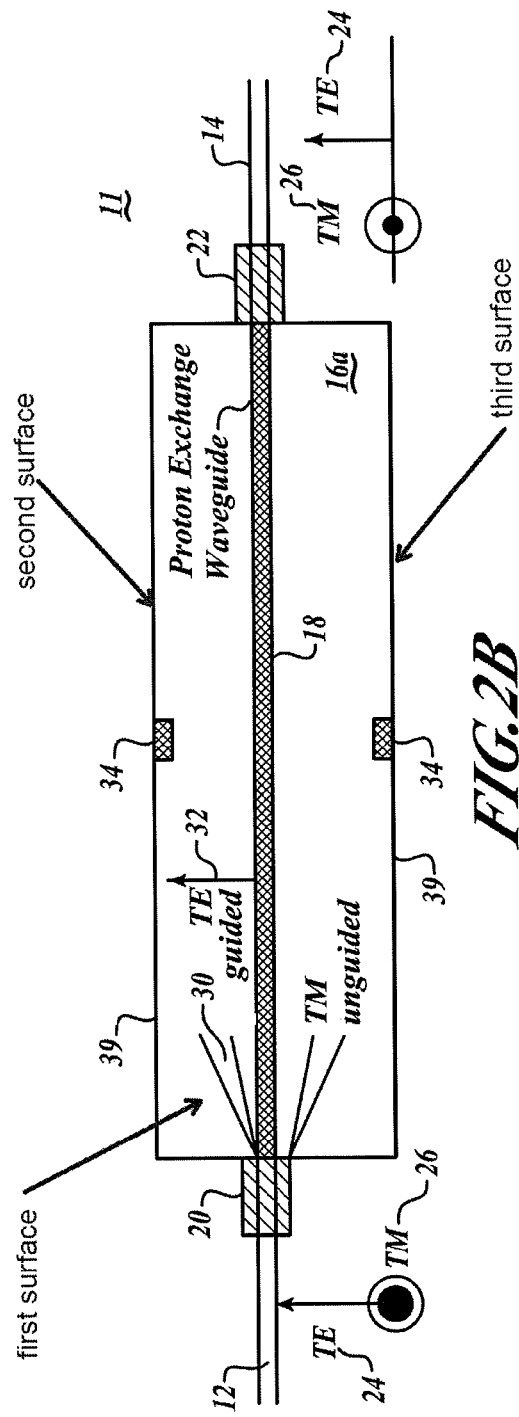

DEVICES AND METHODS FOR SPATIAL FILTERING

BACKGROUND OF THE INVENTION

Optical wave guide devices fabricated by the Proton Exchange (PE) method provide some unique qualities. The process of proton exchange increases the refractive index only in extraordinary axis and thus will only guide one polarization state. The other polarization state is unguided and is eventually eliminated. This quality of Proton Exchange devices makes them naturally very high performance polarizers (60 dB or more). In addition, this quality makes them very attractive for use in Multiple Function Chips (MFCs) used in construction of fiber optic gyros (FOGs).

Now refer to FIG. 1A which shows a schematic diagram of a proton exchange polarizer with crosstalk. A proton exchange polarizer 10 includes a $LiNbO_3$ or $LiTaO_3$ material forming an optically transmissive substrate 16. The proton exchange polarizer 10 further includes a glass ferrule 20 as an input coupling for an optical fiber 12 and a glass ferrule 22 coupled to an output fiber 14. The optical fiber 12 receives light comprised of both a TE mode 24 and a TM mode 26. The TE mode 24 includes the solutions of Maxwell's equations with symmetric boundary conditions for an optical wave propagating within the waveguide (i.e. LiNbO3 at both sides of the waveguide) and the TM mode 26 includes the solutions of Maxwell's equations with non-symmetric boundary conditions for an optical wave propagating within the waveguide (i.e. LiNbO3 at one side of the waveguide and air at the opposing side of the waveguide). TE mode light 32 is substantially guided by a proton exchange wave guide 18 through the optically transmissive substrate 16. When light exits the fiber 12 the TM mode 26 becomes unguided TM mode light 30. The TE mode 24 becomes guided TE mode light 32 by the proton exchange wave guide 18.

Unguided TM mode light 30 propagates through the optically transmissive substrate 16. A portion of the unguided TM mode light 30 from the polarizer escapes. An angle of reflection 28 may be determined by the dimensions of the particular embodiment, specifically the distance between the glass ferrules 20 and 22.

The TM mode unguided light 30 is reflected as indicated by light 36 from a bottom 17 and sides of the substrate 16 and exits the substrate through fiber 14. The reflected unguided TM mode light 36 is unwanted in various applications such as fiber-optic gyros.

During the development of proton exchange devices it was discovered that some devices do not have very high extinction ratios (more than 60 dB) as expected. It was also found that the polarizer extinction ratio decreased with device length. After studying different devices, it was concluded that the crosstalk/modulator mechanism had TM light 30 that was unguided by the wave guide 18 and reflected from the bottom 17 and sides of the substrate 16. The reflected TM light 36 was then collected by the output fiber 14. It was believed that longer polarizer length results in a smaller angle of reflection, which increases this pickup. Several polarizers of different lengths were measured to confirm this theory.

SUMMARY OF THE INVENTION

The invention provides a proton exchange polarizer where cross-coupling of unwanted modes of light is reduced with an integrated spatial filter. An optically transmissive substrate such as a substrate created from $LiNbO_3$ or $LiTaO_3$ has side surfaces which reflect unguided TM mode light. The light originates from an input fiber. The input fiber is connected to the substrate at one end and an output fiber is connected to receive guided TE mode light at the opposite end. The sides of the substrate couple the unguided TM mode light to the output fiber. This coupling is undesirable in various polarizer applications such as those used in fiber-optic gyros. The extinction ratio of the substrate is improved by the incorporation of a spatial filter. The spatial filter is positioned at the primary reflection position of the light with respect to the sides of the polarizer. To improve extinction further, the spatial filter can also be located at secondary reflection points in another alternate embodiment. The spatial filter is positioned within the substrate or at the sides of the substrate, depending on whether the barrier was created by physical or chemical methods such as saw cutting, etching, diamond machining, micromachining, or laser-machining. The spatial filter acts to block the propagation of the unguided TM light.

BRIEF DESCRIPTION OF THE DRAWINGS

Preferred and alternative embodiments of the present invention are described in detail below with reference to the following drawings:

FIG. 1A schematically shows a proton exchange polarizer side view illustrating a crosstalk/modulator mechanism formed in accordance with the prior art;

FIG. 1B schematically shows a proton exchange polarizer top view illustrating the crosstalk/modulator mechanism; formed in accordance with the prior art;

FIGS. 2A, B show side and top views of a filter formed in accordance with an embodiment of the present invention;

DETAILED DESCRIPTION OF THE PREFERRED EMBODIMENT

Figure 3B:
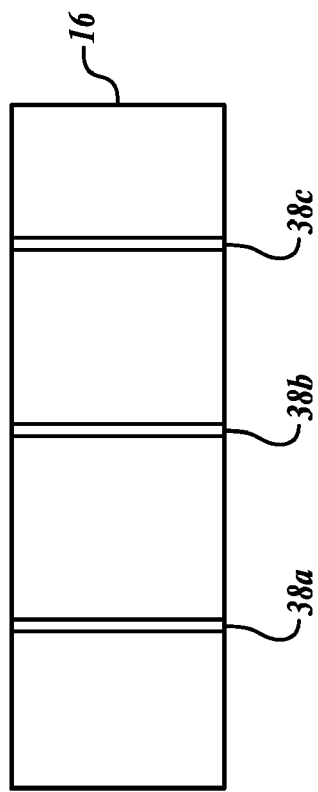
FIG. 3B shows a side view of the spatial filter of FIG. 3A.

FIGS. 2A, B show a proton exchange polarizer 11 with an integrated spatial filter 34 located in the substrate 16a. The substrate 16a couples a fiber 12 with ferrule 20 to fiber 14 to ferrule 22. The substrate 16a incorporates a proton exchange wave guide 18. The TM mode unguided light 30 propagates through the light conducting substrate 16a but is blocked by spatial filter 34 incorporated into the substrate 16a. The spatial filter 34 prevents reflected light from coupling back into the output fiber 14 by blocking the propagation of the light wave. The barrier, or the spatial filter 34, may be advantageously made by a number of processes including physically depositing the spatial filter 34 into the substrate 16a. The substrate may be saw-cut to create a void in the substrate 16a impeding the propagation of the unguided TM mode light 30. The side may be diamond machined, etched, micro-machined or laser-machined. Alternatively, the surface may simply be scratched or similarly damaged to provide spatial filters in the propagation path of the TM mode unguided light 30.

The reflected TM mode light 30 is thus substantially removed by creating a spatial filter 34 in the sides 39 of the substrate 16a. With the spatial filter 34 or barrier incorporated into the substrate 16a, any reflected TM light 30 will be substantially blocked. However, there are multiple paths at which reflections may occur. In order to achieve high performance, both primary and secondary reflections must be substantially removed. Experimentally, it was found that three equally spaced spatial filters are required to satisfactorily remove the primary and secondary reflections.

Figure 3A:
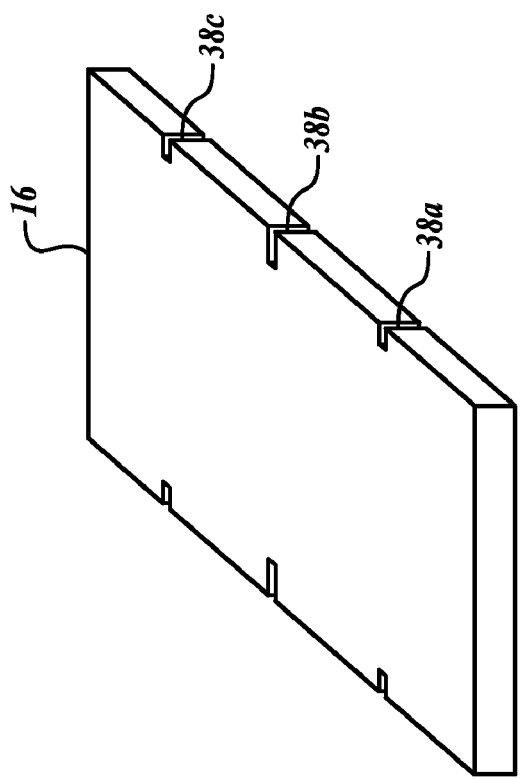
FIG. 3A shows a perspective view of a spatial filter created by cutting a slot in the sides of the substrate.

FIGS. 3A, B shows a spatial filter created by a dicing saw. FIG. 3A shows an isometric view of the substrate 16 with three slots 38a, 38b and 38c. Slots 38a and 38c are used to attenuate the secondary reflections and 38b is intended to remove the primary reflection. The side of the substrate 16 is shown with cuts made across the entire height of the substrate 16. The side view shows the slots 38a, 38b, and 38c cut into the side of the substrate 16 attenuating the primary and secondary reflections.

Figure 4:
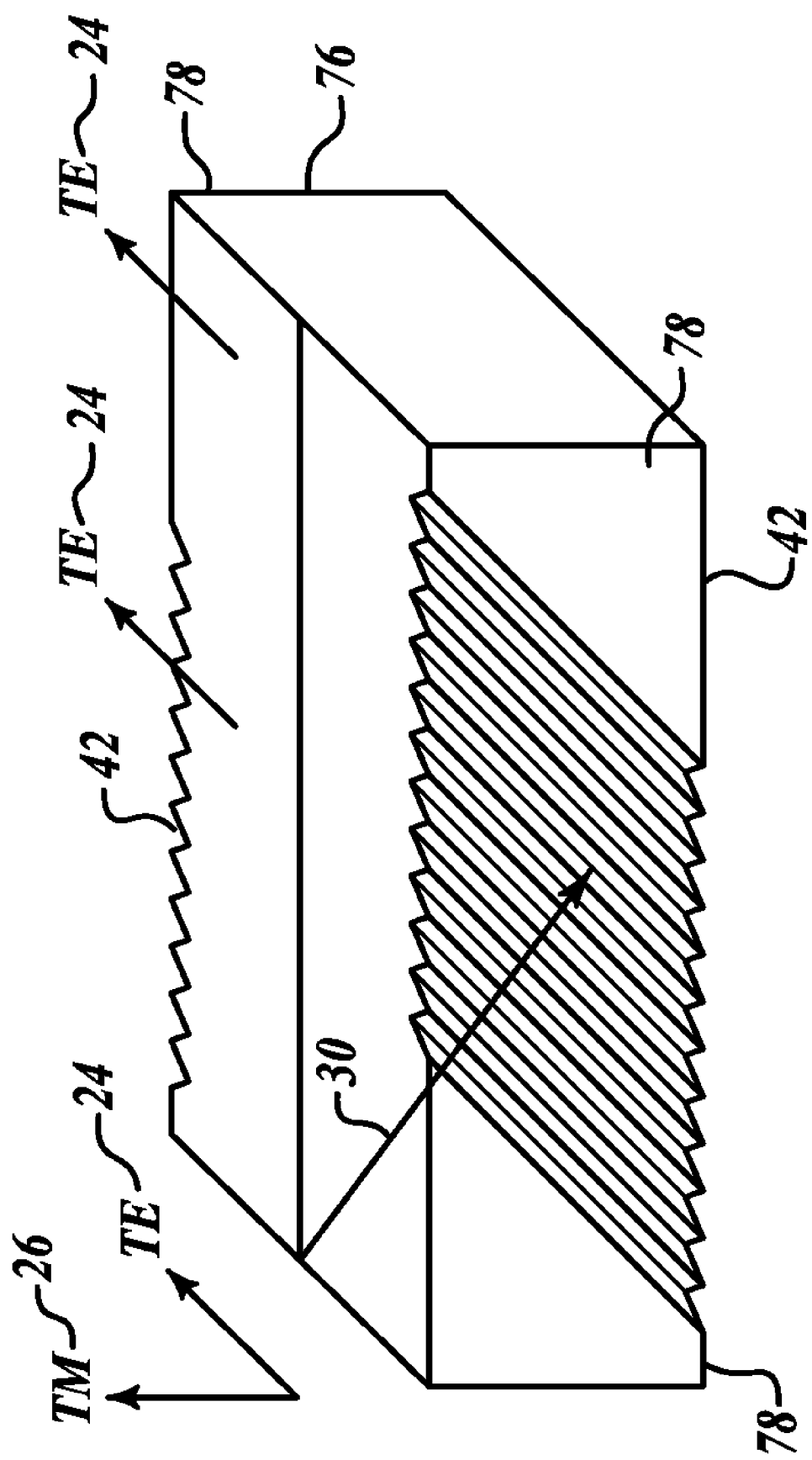
FIG. 4 shows a isometric view of the substrate with grooves in the side wall of the substrate.

FIG. 4 shows micro-etched grooves 42 in a substrate 76. The micro-etched groves 42 are formed on vertical sides 78 of the substrate 76 substantially at about a 45° angle as referenced to an incoming beam of light. In this way, reflected light is rejected at an angle of about 90° off the incident beam. The grooves may be formed by chemical etching or by mechanical abrasion (saw cuts, grinding, etc.).

Figure 5:
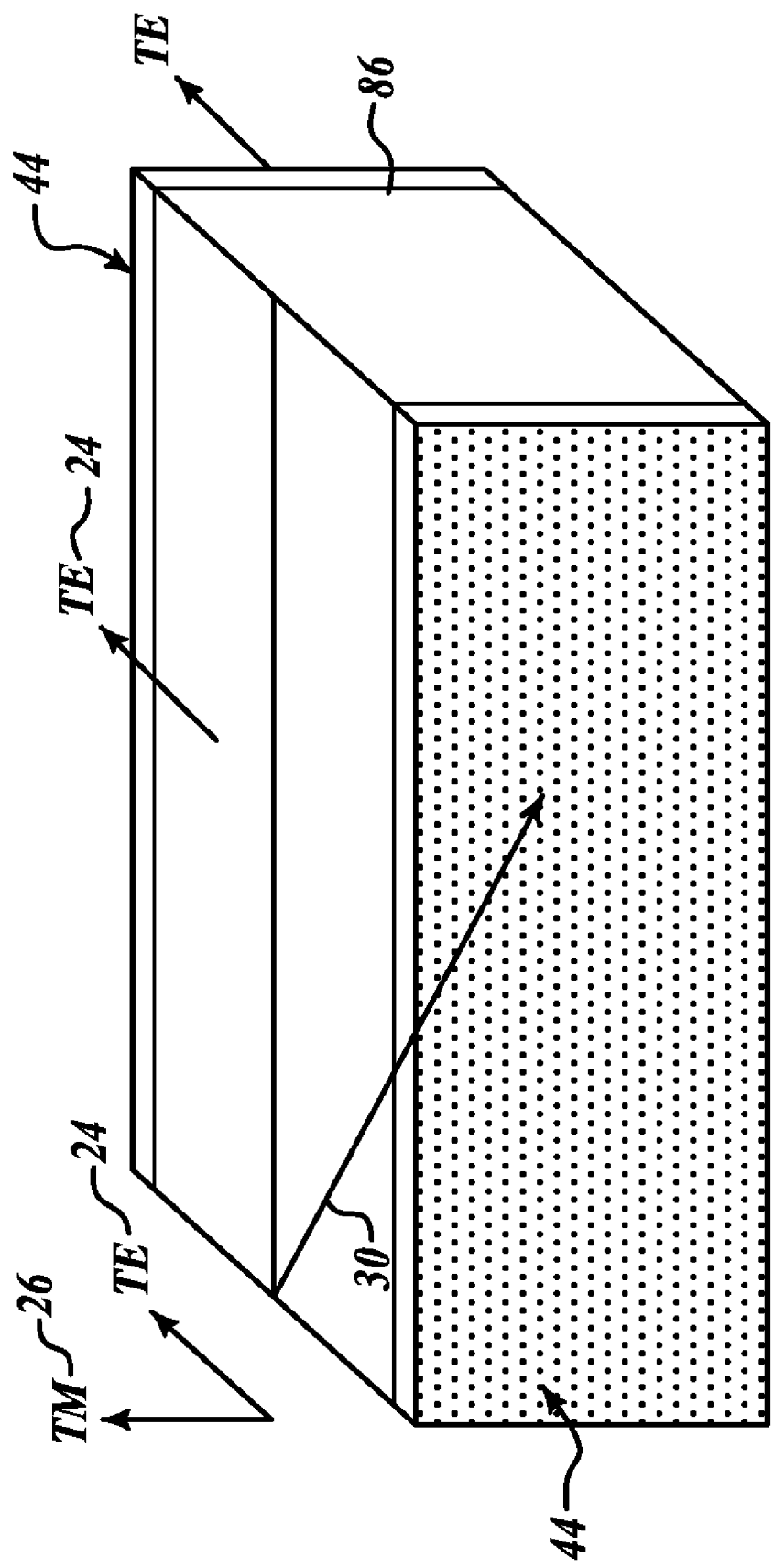
FIG. 5 shows an anti-reflective coating on the sides of a substrate used to absorb unguided TM or light in the anti-reflective layer.

FIG. 5 shows an alternate embodiment of the present invention using an antireflection and absorbing layer 44 at the sides of a substrate 86 so that there are no reflections from the sides of substrate 86. Antireflection layers may be formed by deposition of dielectric materials such as Magnesium Fluoride, silicon, or polymers.

The present invention may be combined with a spatial filter located on the bottom surface of the substrate, such as that shown and described in U.S. Pat. No. 5,475,772, which is hereby incorporated by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A proton exchange polarizer device comprising:
   an optically transmissive substrate having a first surface, and second and third surfaces approximately perpendicular to the first surface, the first surface having an extraordinary axis with an increased refractive index for guiding only one polarization state of light;
   a proton exchange waveguide formed on the first surface of the optically transmissive substrate, having an extraordinary axis with an increased refractive index for guiding only one polarization state and having an input coupling on a first end and an output coupling on a second end;
   a first antireflection component formed from a first edge of the second surface to a second edge of the second surface of the optically transmissive substrate, wherein the first edge of the second surface is adjacent to the first surface and the second edge of the second surface is approximately parallel to the first edge of the second surface;
   a second antireflection component formed from a first edge of the third surface to a second edge of the third surface of the optically transmissive substrate, wherein the first edge of the third surface is adjacent to the first surface and the second edge of the third surface is approximately parallel to the first edge of the third surface,
   wherein:
      light entering the input coupling has a TE mode and a TM mode;
      light having the TE mode is substantially guided by the proton exchange waveguide;
      light having the TM mode is substantially unguided; and
      a portion of the light having the TM mode propagates through the optically transmissive substrate, and almost all of the portion of the light is unreflected because of the antireflection components.

2. The device of claim 1, wherein the substrate comprises $LiNbO_3$.

3. The device of claim 1, wherein the substrate comprises $LiTaO_3$.

4. The device of claim 1, further comprising a third antireflection component that comprises an array of micro-grooves formed on the second and third surfaces.

5. The device of claim 4, wherein the array of micro-grooves has a direction of approximately 45 degrees relative to a direction from the first end to the second end of the proton exchange waveguide.

6. The device of claim 1, further comprising a third antireflection component that comprises one or more deformations formed on the second and third surfaces.

7. The device of claim 6, wherein one of the deformations is a slot having a longitudinal direction approximately perpendicular to the extraordinary axis of the substrate.

8. The device of claim 7, wherein the one or more slots includes first, second and third slots, the second slot is approximately equidistant from the first and second ends of the optically transmissive substrate, the first slot is approximately equidistant from the second slot and the first end of the optically transmissive substrate, and the third slot is approximately equidistant from the second slot and the second end of the optically transmissive substrate.

* * * * *